(12) United States Patent
Toillon et al.

(10) Patent No.: US 9,921,844 B2
(45) Date of Patent: Mar. 20, 2018

(54) MULTI-USER PROCESSOR SYSTEM FOR PROCESSING INFORMATION

(71) Applicant: THALES, Courbevoie (FR)

(72) Inventors: Patrice Georges Paul Toillon, Fourqueux (FR); Hicham Agrou, Meudon la Foret (FR)

(73) Assignee: THALES, Courbevoie (FR)

( * ) Notice: Subject to any disclaimer, the term of this patent is extended or adjusted under 35 U.S.C. 154(b) by 170 days.

(21) Appl. No.: 14/765,950

(22) PCT Filed: Feb. 3, 2014

(86) PCT No.: PCT/EP2014/052062
§ 371 (c)(1),
(2) Date: Aug. 5, 2015

(87) PCT Pub. No.: WO2014/122097
PCT Pub. Date: Aug. 14, 2014

(65) Prior Publication Data
US 2015/0370572 A1    Dec. 24, 2015

(30) Foreign Application Priority Data
Feb. 5, 2013   (FR) .................................. 13 00232

(51) Int. Cl.
G06F 9/46     (2006.01)
G06F 9/38     (2018.01)
G06F 9/52     (2006.01)

(52) U.S. Cl.
CPC ............ G06F 9/3836 (2013.01); G06F 9/466 (2013.01); G06F 9/52 (2013.01)

(58) Field of Classification Search
None
See application file for complete search history.

(56) References Cited

U.S. PATENT DOCUMENTS

| 5,287,501 | A | * | 2/1994 | Lomet | G06F 11/1474 |
| | | | | | 707/648 |
| 5,553,280 | A | * | 9/1996 | Fortier | G06F 17/30575 |
| 6,012,094 | A | * | 1/2000 | Leymann | G06F 9/466 |
| | | | | | 707/999.202 |
| 6,442,533 | B1 | * | 8/2002 | Hinkle | G06Q 40/00 |
| | | | | | 705/30 |

(Continued)

FOREIGN PATENT DOCUMENTS

WO    WO9301549    1/1993

*Primary Examiner* — Mehran Kamran
(74) *Attorney, Agent, or Firm* — Davidson, Davidson & Kappel, LLC (57) ABSTRACT

This multi-user processor system for processing information, of the type including a data exchange engine (3) associated with multiple users (1) of shared resources (2), is characterized in that it includes means (4) for controlling data exchange in the processor, associated with each user, the exchange engine and the shared resources, in order to authorize transactions or not and in that the engine includes means (5) for breaking down authorized transactions into elementary sub-transactions, means (6) for interlacing the sub-transactions obtained from the breaking down of the authorized transactions of several users and the means (6) for distributing these interlaced sub-transactions among the different resources.

9 Claims, 9 Drawing Sheets

(56) References Cited

U.S. PATENT DOCUMENTS

| | | | |
|---|---|---|---|
| 6,813,251 B1* | 11/2004 | Garney | G06F 13/405 370/257 |
| 8,600,789 B1* | 12/2013 | Frew | G06Q 40/02 705/45 |
| 2002/0087441 A1* | 7/2002 | Wagner, Jr. | G06Q 30/06 705/30 |
| 2002/0095602 A1* | 7/2002 | Pherson | H04L 63/101 726/1 |
| 2004/0049452 A1* | 3/2004 | Blagg | G06Q 20/04 705/39 |
| 2004/0215904 A1 | 10/2004 | Gopisetty et al. | |
| 2005/0021736 A1* | 1/2005 | Carusi | H04L 12/2602 709/224 |
| 2005/0075967 A1* | 4/2005 | Sandhu | G06Q 30/02 705/37 |
| 2005/0269398 A1* | 12/2005 | Robinson | G06Q 20/105 235/380 |
| 2006/0107255 A1* | 5/2006 | Chagoly | G06F 11/3495 717/127 |
| 2006/0136334 A1* | 6/2006 | Atkinson | G06Q 10/087 705/40 |
| 2006/0167792 A1* | 7/2006 | Hahn-Carlson | G06Q 10/0875 705/40 |
| 2007/0016831 A1* | 1/2007 | Gehman | G06F 11/079 714/43 |
| 2007/0038560 A1* | 2/2007 | Ansley | G06Q 20/10 705/39 |
| 2008/0033878 A1* | 2/2008 | Krikorian | G06Q 20/02 705/44 |
| 2008/0052678 A1* | 2/2008 | Chagoly | G06F 11/3466 717/124 |
| 2008/0192559 A1* | 8/2008 | Bains | G11C 7/1042 365/230.03 |
| 2008/0215465 A1* | 9/2008 | Capadouca | G06Q 20/202 705/30 |
| 2009/0287865 A1* | 11/2009 | Aldworth | G06F 13/362 710/110 |
| 2011/0041006 A1* | 2/2011 | Fowler | G06F 9/466 714/10 |
| 2011/0283042 A1* | 11/2011 | Jeon | G06F 13/00 711/5 |
| 2012/0324449 A1* | 12/2012 | Huetter | G06F 9/5066 718/1 |
| 2013/0219396 A1* | 8/2013 | Kasravi | G06Q 40/00 718/101 |
| 2013/0262733 A1* | 10/2013 | Boucard | G06F 13/4059 710/309 |
| 2014/0052586 A1* | 2/2014 | Weber | G06Q 30/0637 705/26.82 |
| 2015/0120531 A1* | 4/2015 | Stridh | G06Q 20/38 705/39 |

* cited by examiner

MULTI-USER PROCESSOR SYSTEM FOR PROCESSING INFORMATION

The present invention relates to a multi-user processor system for processing information. More particularly, the invention relates to such a system which includes a data exchange engine associated with multiple users of shared resources. Thus, the invention is mainly located notably in the field of digital data processing cores of the type of processors, multi-processors, control units, microcontrollers, etc. In particular, such a multi-user processor system may be used in association with pieces of equipment applied in aeronautical systems, like for example applied to onboard avionics.

It is known that studies have already been conducted for a certain time in order to improve the operating predictability of systems of this nature. Indeed, the present context corresponds to a predictable need for example from a time point of view, for processing transactions or data exchanges in resources or shared areas such as for example memories or further inputs/outputs between several users or initiators.

The object of the invention is to improve this type of systems and by relying on a robust time organization of the transactions and exchanges and on associated mechanisms by guaranteeing fair sharing of the shared resources while maintaining predictability of the accesses.

For this purpose, the object of the invention is a multi-user processor system for processing information, of the type including a data exchange engine associated with multiple users of shared resources, characterized in that it includes a means for controlling data exchanges in the processor, associated with each user, the exchange engine and the shared resources, in order to allow transactions or not and in that the engine includes means for breaking down the allowed transactions into elementary sub-transactions, means for interlacing the sub-transactions obtained from the breakdown of allowed transactions of several users and means for distributing these interlaced sub-transactions among the different resources.

According to other features taken alone or as a combination of the system according to the invention:
- the breakdown means comprise means for cutting out the transactions according to their size and/or their type and/or the number of resources, either identical or different per user and/or among the latter;
- the distribution means comprise means for distributing interlaced sub-transactions among the resources;
- the interlaced sub-transactions are distributed/dispersed into each queue associated with each shared resource;
- the engine includes means for inserting a transaction for substituting an unauthorized or absent transaction;
- the engine includes means for inserting a sub-transaction for substituting an absent sub-transaction;
- the engine includes means for monitoring proper execution of the sub-transactions in order to validate proper execution of the corresponding transaction;
- the engine is adapted for distributing the sub-transactions among the resources in a balanced way or not;
- the engine is a adapted for distributing the sub-transactions among the resources in a programmable way depending on the space-time configuration for connecting the users and/or the shared resources;
- the means for interlacing the sub-transactions and for distributing these interlaced sub-transactions either fit a static law and/or a configurable law and/or a law evolving over time and/or depending on the internal behavior of the exchange engine.

The invention will be better understood by means of the description which follows, only given as an example and made with reference to the appended drawings, wherein.

Figure 1:
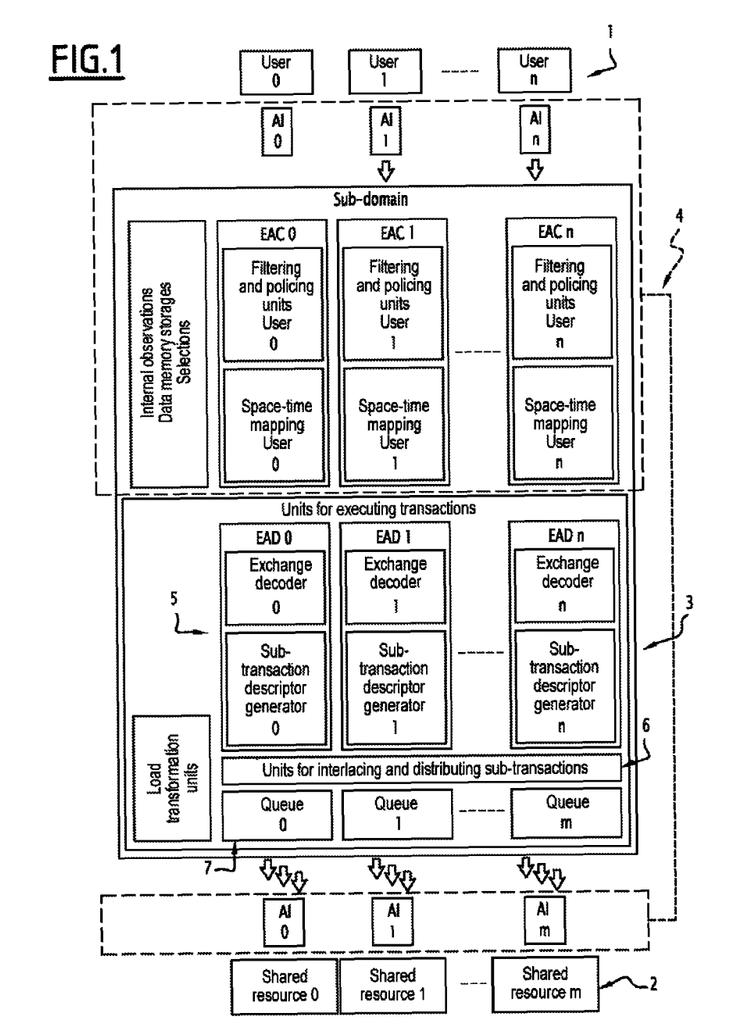
FIG. 1 represents a block diagram illustrating the structure and the operation of a multi-user processor system for processing information according to the invention.

Indeed, a general block diagram is illustrated on these figures and in particular in FIG. 1, illustrating the structure of a multi-user processor system for processing information.

The latter is then placed between different users are designated by the general reference 1 in this FIG. 1 and shared resources designated by the general reference 2. In fact, this multi-user processor system for processing information may include what may be called a data exchange engine, designated by general reference 3 in this FIG. 1, which is therefore place between multiple users and shared resources.

In the illustrated example, the engine 3 is actually a device for managing concurrent transactions which come from several users 0 to n, towards or intended for different shared resources 0 to m. This device then guarantees fair sharing in terms of bandwidth/throughput of the shared resources, for the users, while making the time and duration of their accesses predictable. This engine then includes means for controlling data exchange in the processor, associated with each user, the exchange engine and the shared resources for either authorizing transactions or not.

Moreover, this in fact stems from a contract for authorizing/inserting frames (and/or transactions). These means forming an engine are designated by the general reference 4 in this FIG. 1 and then comprise units for filtering and managing users, space-time mappings of the users, etc., giving the possibility of ensuring fair sharing (or not) of the shared resources in order to maintain the predictability of the duration of the accesses and therefore the predictability of the operation of such a system, either authorizing on lots transactions. In addition to these elements, the engine also includes means for breaking down the authorized transactions into elementary sub-transactions, means for interlacing the sub-transactions obtained from the breaking down of authorized transactions of several users and the means for distributing these interlaced sub-transactions among the different resources.

Thus, in this FIG. 1, the means for breaking down authorized transactions into elementary sub-transactions are designated by the general reference 5, and the means for interlacing sub-transactions obtained from the breaking down of the authorized transactions of several users, are designated by the general reference 6, these means also include means for distributing these interlaced sub-transactions among the different resources and more particularly the different queues associated with the latter, as designated by the general reference 7 in this FIG. 1.

These means 6 for interlacing sub-transactions and for distributing these interlaced sub-transactions then fit for example either a static law and/or a configurable law and/or a law evolving over time and/or depending on the internal behavior of the exchange engine.

As this will be described in more detail subsequently, the engine includes a means for inserting a transaction for substituting an unauthorized or absent transaction and that means for inserting a sub-transaction for substituting an absent sub-transaction.

Figure 2:
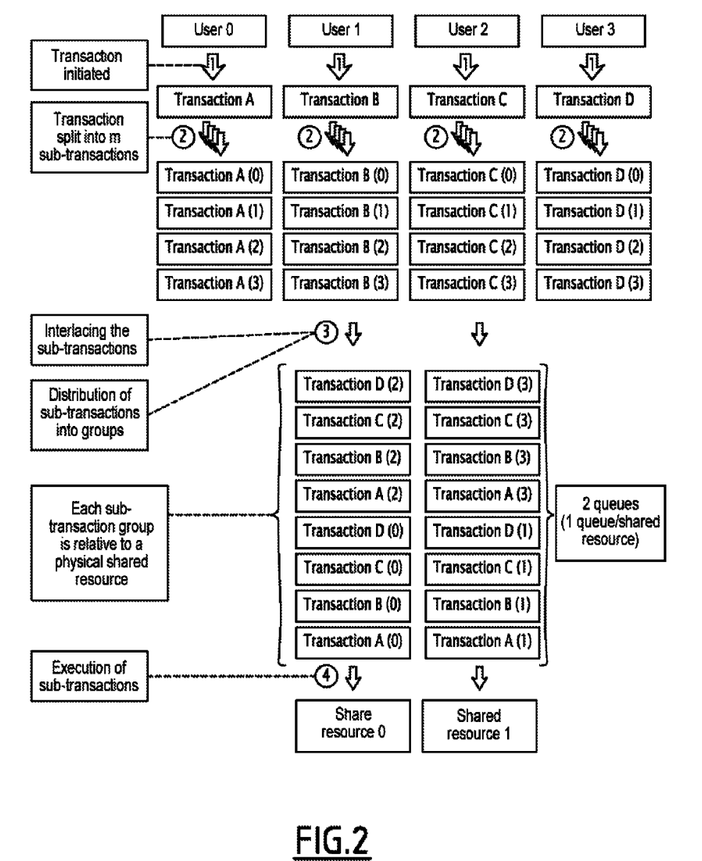
FIGS. 2 to 9 illustrates different operating scenarios of such a processor structure.

In fact, and for better making apparent the operation of such a system, an example of applying transactions with reference to FIG. 2, according to a configuration with four users, four sub-transactions and two shared resources was described.

The four users are designated by user 0, 1, 2 and 3 in FIG. 2. The corresponding transactions are designated by transaction A, B, C and D. The first operation then consists of cutting out each transaction into sub-transactions, for example designated by (sub)-transaction A(0), A(1), A(2), A(3) for transaction A. The other transactions B, C and D are cutouts in the same way into corresponding sub-transactions. As this will be described in detail subsequently, this cutting-out is then made of according to the size of these transactions and/or of their type and/or to the number of available (connected) shared resources and it may be expressed by identical or different cutting-outs per user and/or among the latter.

Once these sub-transactions are obtained by breaking down the authorized transactions from different users, these are sub-transactions are interlaced on the one hand and distributed among the available shared resources for example 0 and 1, on the other hand. Thus, for example the distribution means may include means for distributing/dispersing the sub-transactions in each queue associated with each shared resource, such as the queues associated with the shared resources 0 and 1 illustrated in this FIG. 2.

Each thereby generated group of sub-transaction is then relative to a physical shared resource and then there is in the example described in this FIG. 2, two queues, i.e. one queue per shared resource. The queues then contain a distribution of sub-transaction as illustrated, this distribution may either be balanced or not among these queue, i.e. among these shared resources.

Moreover the engine may be adapted for distributing the sub-transactions among the resources in a programmable way depending on the space-time configuration of the connections of the users and/or of the shared resources.

Figure 3:
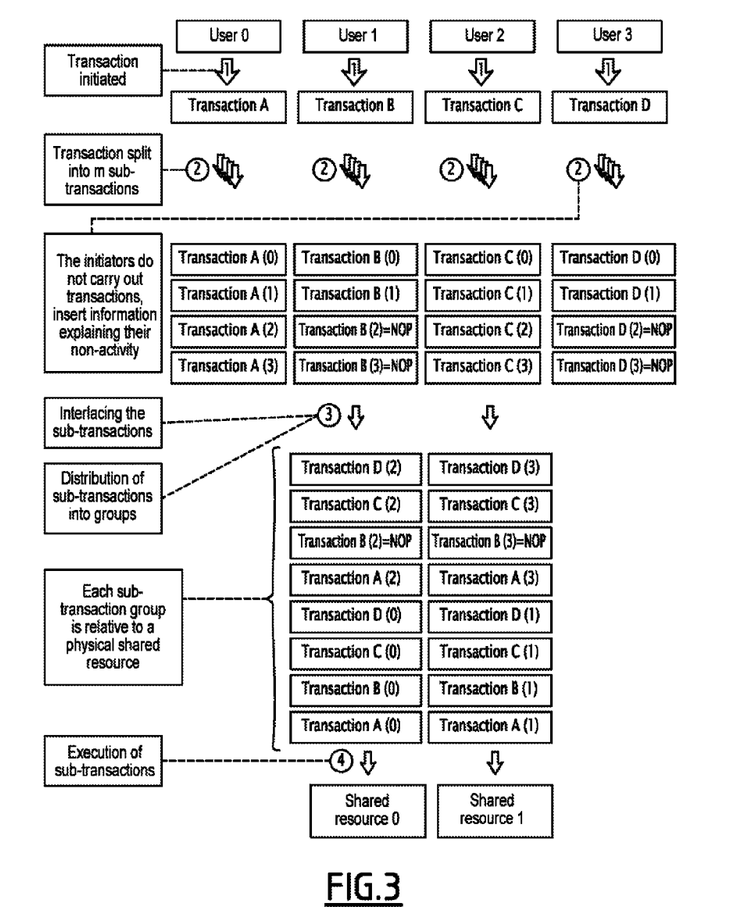

In FIG. 3, a situation is illustrated in which the user 1 produces a transaction of intermediate size. This user then sees his/her authorized transaction expressed in active sub-transactions and in non-active (non-operational) sub-transactions of the NOP type. Thus, the exchange engine may be equipped with means for inserting a sub-transaction for substituting an absent sub-transaction.

Figure 4:
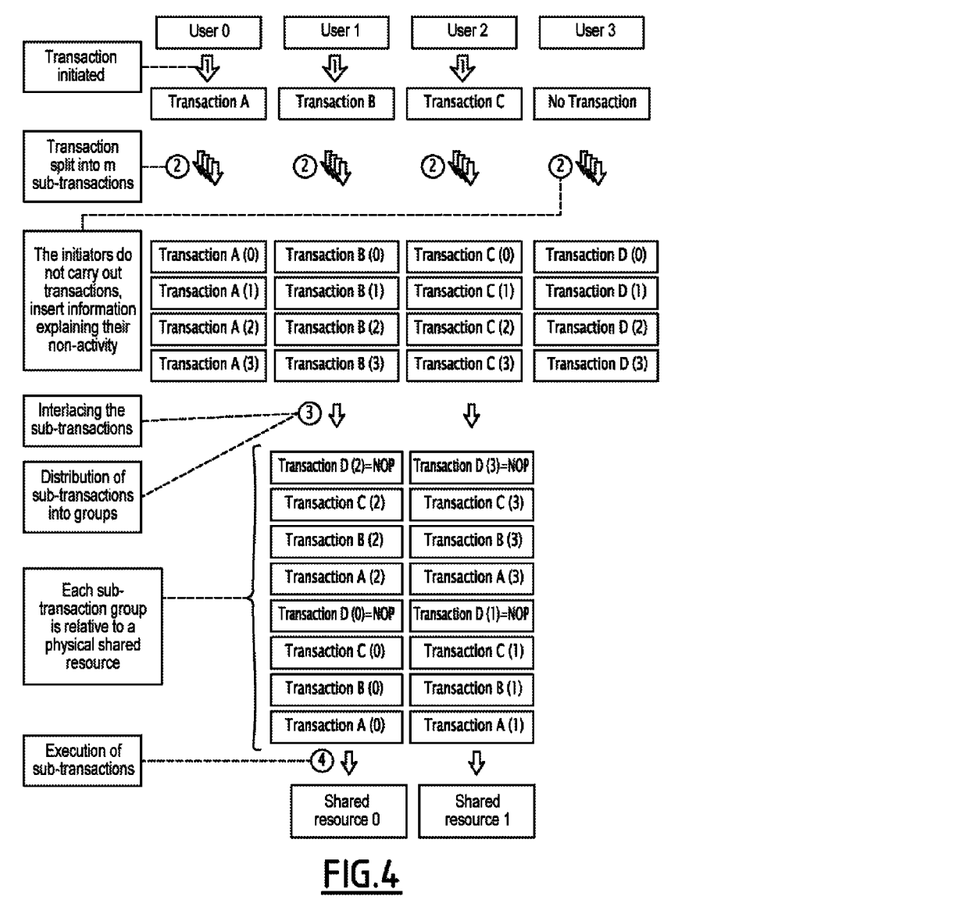

Also this engine may include means for inserting a transaction for substituting an unauthorized or absent transaction. This is also for example illustrated in FIG. 4, which are represents the case when the user 3 does not produce any transaction, which notably implies the generation and the insertion of a substitute NOP sub-transaction.

Figure 5:
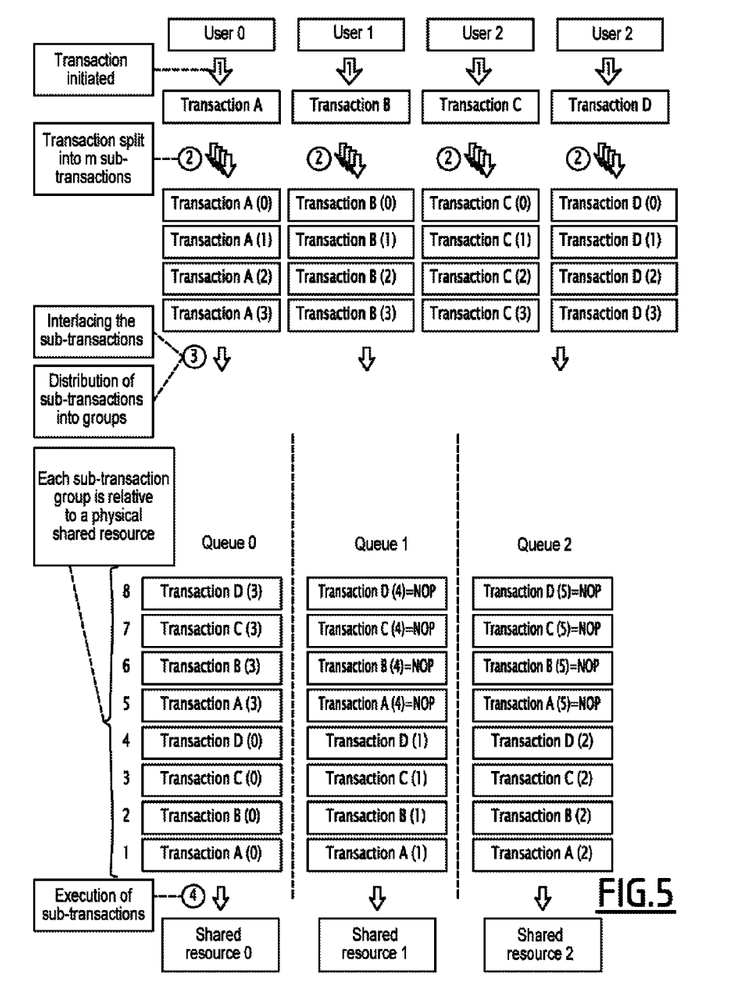

FIG. 5, as for it, illustrates the scenario when the architecture is overdimensioned in terms of shared resources. In this example, the number of shared resources, r, is 3, the number of sub-transactions characterizing the transactions, n, is limited to 4. As r is not the smallest submultiple of n, this implies during the interlacing and distribution phases described earlier, insertions of sub-transactions of the NOP type in order to guarantee fairness in accessing shared resources. In terms of access, they then correspond to the same type of transactions as described earlier.

Figure 6:
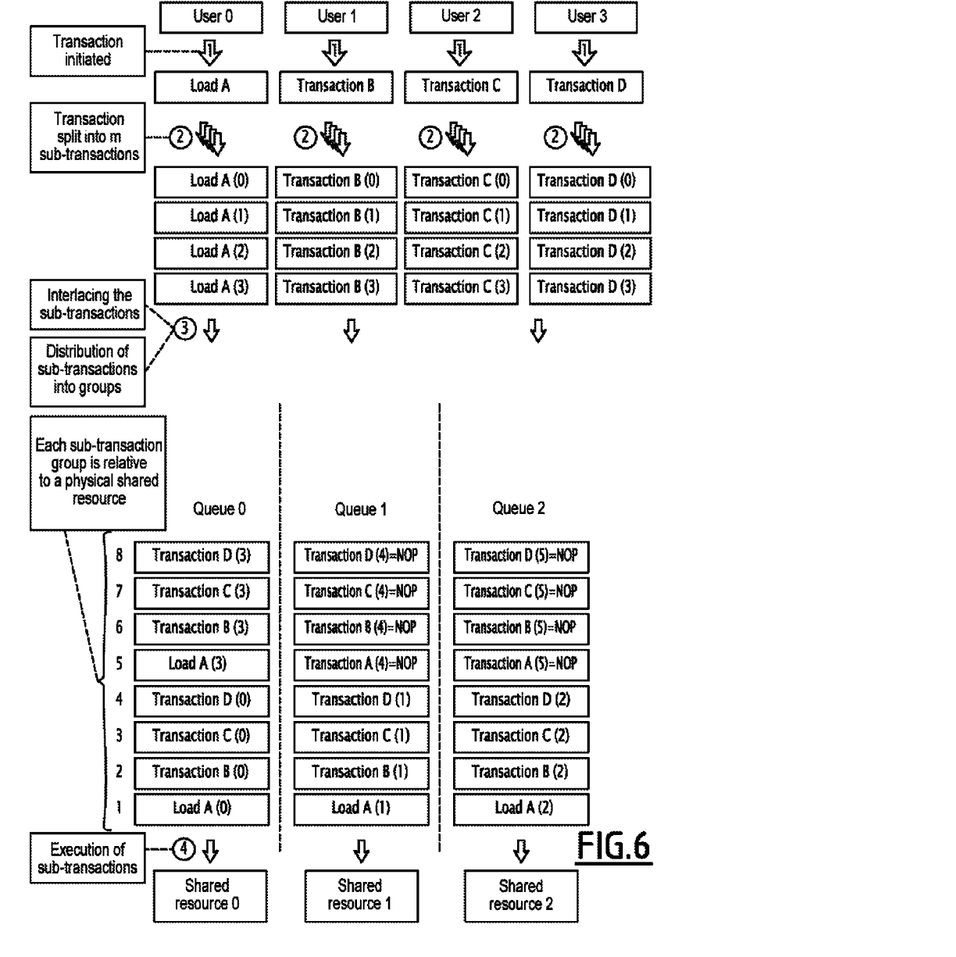

Thus, and in this example illustrated in FIG. 5, the lines 5, 6, 7 and 8 of the queues for the shared resources 1 and 2, contain substitute sub-transactions of the NOP type. I FIG. 6 represents the scenario when the user 0 produces a transaction of the read type (LOAD). The first sub-transactions to be executed correspond to LOAD A(0), LOAD A(1) and LOAD A(2). At the stage illustrated in the figure, none of these sub-transactions is completed.

Figure 7:
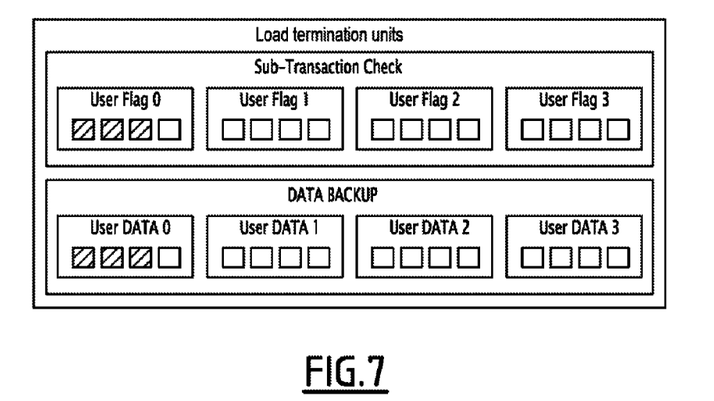

FIG. 7 represents the situation for terminating these three sub-transactions. But the transaction is not considered as completed, since only these first three sub-transactions are considered as completed.

Figure 8:
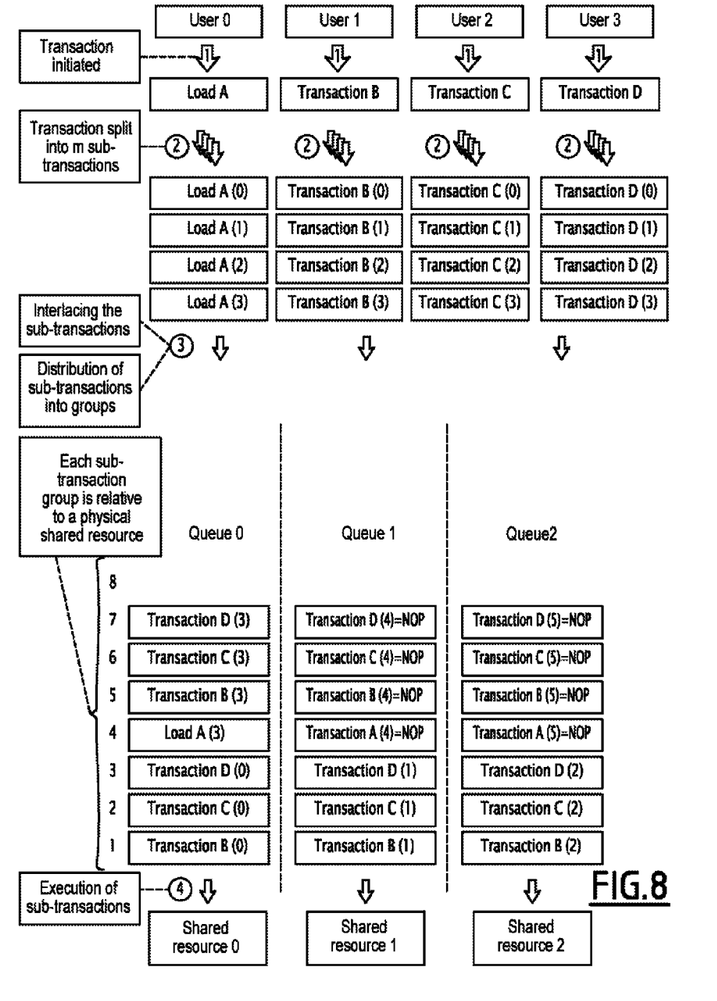

Therefore, it is necessary to complete the sub-transactions of lines 2, 3 and 4 of the associated queues (cf. FIG. 6). This is illustrated in FIG. 8, which shows the initiation of the first three sub-transactions of the user 1.

Figure 9:
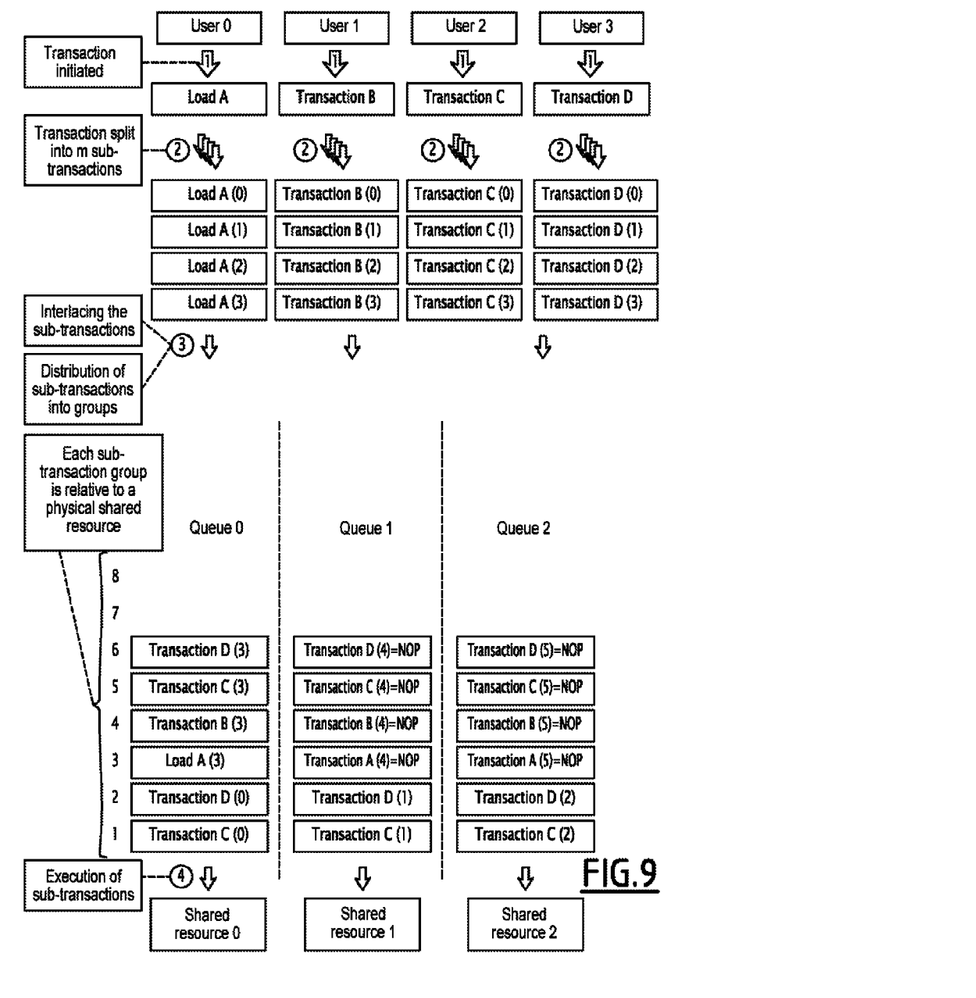

FIG. 9, as for it, represents an initiation of the first three sub-transactions of the user 2. This procedure is repeated.

When the sub-transactions LOAD A(3), LOAD A(4) and LOAD A(5) are initiated, the vanity and status bits of the sub-transactions LOAD A(0), LOAD A(1), and LOAD A(2), are maintained in the high state. Thus, it is possible for the engine to apply integrated means for monitoring proper execution of the sub-transactions in order to validate proper execution of the corresponding transaction. Thus the unit for executing transaction is for example observable and the optionally includes a integrated means for self-controlling proper operation.

In the different appended figures and in particular in FIG. 1, the terms of AI have been used for designating access interfaces (AI acronym for access interface, EAC for designating exchanger access controllers (also known under the acronym of « Exchanger Access Check» (EAC)) and EAD for designating exchanger access decoders (EAD for « Exchanger Access Decoder» ).

During an access, each user indeed has the attributes of his/her transaction at its EAD. Each user only accesses a single EAD which is specific to him/her.

Each EAD sequentially achieves two operations i.e.:
decoding of the transaction, and
breaking down the latter into sub-transactions.

During the phase for decoding the transaction, descriptors are generated each designating:
either a transaction type of the same type as the transaction initiated by the user,
or a piece of information indicating that the user does not carry out any transaction.

This scenario appears every time when a user does not carry out any transaction. A substitute transaction is then used. The breaking down into sub-transactions is initiated at the end of the decoding phase. When the descriptor of a transaction (or of a non-transaction) is generated, the latter allows definition of the sub-transactions.

Indeed, each transaction is fragmented by the EAD into sub-transactions of a submultiple of the maximum size of the transaction from which they stem. This is achieved, consistent with the width of the user databus and optionally with the number of available shared resources. The whole of these sub-transactions forms a consistent set in terms of addressing, transaction type and total size of the emitted/received data.

The number of sub-transactions associated with each transaction size depends as this was indicated earlier, on the size of the width of the databus and on the number of shared resources. These sub-transaction corresponds to the smallest possible transaction size from the point of view of the user. Thus, the size of the sub-transactions is a submultiple of the transaction from which it derives.

Within the scope of a transaction of maximum size, the transaction is broken down into sub-transactions of a submultiple size of the maximum size of the transaction from which they stem. As indicated earlier, this is achieved, consistent with the width of the databus of the user. Their number also depends on the number of available shared resources.

In the case when the user does not carry out any transaction, a descriptor is generated during the decoding phase and indicates when no transaction is carried out. This is expressed by the generation of particular sub-transactions i.e. substitute NOPs and does not imply any data exchange. They only have the purpose of guaranteeing fairness among the users even in the case of no exchange. Thus, the maximum number of NOPs for a transaction corresponds to the maximum possible number of sub-transactions for a transaction of the user.

If the largest possible transaction is broken down into a maximum of four sub-transactions and if the user does not carry out any transaction, this will be expressed by the generation of four substitute NOPs for example.

In the case of a transaction of intermediate size, the user carries out a transaction of an intermediate size, i.e. the size of his/her transaction is not 0 and corresponds to the largest possible transaction size.

For transactions of intermediate size, two types of sub-transactions may be applied. One portion of the sub-transactions may be of a submultiple size of the size of the transaction from which they are derived and the other portion may correspond to substitute NOPs, the other NOP transactions will allow alignment of the number of sub-transactions on the number of sub-transactions required for producing a transaction of maximum size in order to guarantee fair access to the resources by the different users.

The means for interlacing and distributing sub-transactions have the role of interlacing the requests from sub-transactions and distributing them in each queue associated with each shared resource. Each shared resource actually has a queue where is stored the list of the requests to be carried out. Indeed, once they are interlaced, the sub-transactions are organized in groups. Each group is associated with one and only one of the controllers of the shared resource.

The sub-transactions of a same group are executed after one another. Thus, the sub-transactions distributed among the different controllers of resources are executed in parallel.

This is what is illustrated in FIG. 2, which represents an example of distribution of the sub-transactions for a configuration with four users 0, 1, 2, 3, and for two shared resources 0 and 1. This figure shows a situation where the whole of the users carry out transactions at the same instant, and of same size (the largest in this case). Two steps are added to those shown in FIGS. 2 to 5.

Indeed, once the sub-transactions are carried out within the scope of a transaction for example of the « LOAD » type, the read datum has to be reconstructed.

Indeed, the datum is fragmented into data elements, the number of which corresponds to the number of effective sub-transactions.

When the last sub-transaction (including NOPs in the case of an intermediate size transaction) has completed, a signal is transmitted to the units for terminating this LOAD transaction, in order to indicate that the whole of the sub-transactions associated with this transaction is completed and that the data are ready to be recovered.

As soon as this signal is received, the unit for terminating the LOAD transaction, reconstructs the datum from the data obtained by the sub-transactions and transmits it to the user.

Once the reconstructed datum is transmitted to the user, the unit for terminating this transaction confirms the end of the transaction of the user. In the case of a transaction of this type, the group of units for executing transactions reconstructs the datum from data obtained by the sub-transactions derived from the LOAD transaction. Once the datum is reconstructed, it is transmitted to the associated AI of the user having carried out this transaction.

A LOAD transaction may be considered as locally completed when all the validity and status details are in the high state. As soon as this situation appears, data fragments are transmitted sequentially to the user/initiator of the transaction. Thus, the validity and status bits associated with the last sub-transactions of the same transaction do not switch to the high state once all the sub-transactions have been executed.

The transactions A4 and A5 are not taken into account since, in the described scenario, these are NOP sub-transactions. It is only at this instant that the data become available and are sequentially transmitted to the user.

When the user will have transmitted his/her acknowledgment signal, he/she will be allowed to initiate a new transaction. The « User Flag» field of this user will then be reset. It is then conceivable that such a system allows for further improvement in the completion predictability of this type of transactions and therefore operating predictability of this type of system, in general.

Of course other embodiments may further be contemplated.

What is claimed is:

1. A multi-user processor system for processing information in an aeronautical system including:
   a data exchange engine associated with multiple users of shared resources, characterized in that it includes non-transitory computer readable media, having stored thereon, computer executable process steps operable to control the data exchange engine to perform steps including:
   controlling data exchanges in the processor, associated with each user, the exchange engine and the shared resources, for authorizing transactions or not;
   breaking down authorized transactions into elementary sub-transactions;
   interlacing the sub-transactions obtained from the breaking down of the authorized transactions of several users; and
   distributing these interlaced sub-transactions among the different resources;
   inserting a substitute transaction (NOP) for an unauthorized or absent transaction;
   monitoring proper execution of the sub-transactions for validating proper execution of the corresponding transaction
   wherein each transaction is associated to a unit for terminating said each transaction, the unit receiving a signal indicating that all of the sub-transactions associated with said each transaction are completed; and
   wherein the interlacing and the distributing either fit a static law and/or a configurable law.

2. The multi-user processor system for processing information according to claim 1, characterized in that the breaking down comprises:
   cutting out the transactions according to their size and/or their type and/or to the number of resources.

3. The multi-user processor system for processing information according to claim 2, characterized in that the interlaced sub-transactions are distributed/dispersed in each queue associated with each shared resource.

4. The multi-user processor system for processing information according to claim 2, characterized in that the distributing comprises:
   dispersing the interlaced sub-transactions among the resources.

5. The multi-user processor system for processing information according to claim 4, characterized in that the interlaced sub-transactions are distributed/dispersed in each queue associated with each shared resource.

6. The multi-user processor system for processing information according to claim 1, characterized in that the engine is adapted for distributing the sub-transactions among the resources in a balanced way or not.

7. The multi-user processor system for processing information according to claim 1, characterized in that the engine is adapted for distributing the sub-transactions among the resources in a programmable way depending on the space-time configuration of connection of the users and/or on the shared resources.

8. The multi-user processor system for processing information according to claim 1, characterized in that the interlaced sub-transactions are distributed/dispersed in each queue associated with each shared resource.

9. A multi-user processing method for processing information in an aeronautical system by a data exchange engine associated with multiple users of shared resources comprising the steps of:

controlling data exchanges in a processor, associated with each user, the exchange engine and shared resources, including authorizing transactions or not using the exchange engine including the sub-steps of:
breaking down authorized transactions into elementary sub-transactions,
interlacing the elementary sub-transactions obtained from the breaking down step of authorized transactions of several users, and
distributing the interlaced elementary sub-transactions among the different resources; and
inserting a substitute transaction (NOP) for an unauthorized or an absent transaction;
monitoring proper execution of the sub-transactions for validating proper execution of the corresponding transaction;
wherein each transaction is associated to a unit for terminating said each transaction, the unit receiving a signal indicating that all of the sub-transactions associated with said each transaction are completed; and
wherein the interlacing and the distributing either fit a static law and/or a configurable law.

\* \* \* \* \*